United States Patent [19]

Richmond

[11] Patent Number: 4,707,148
[45] Date of Patent: Nov. 17, 1987

[54] TEMPERATURE SENSING DEVICE
[75] Inventor: James C. Richmond, Maywood, N.J.
[73] Assignee: Thermo Electric Instruments, Saddle Brook, N.J.
[21] Appl. No.: 847,212
[22] Filed: Apr. 2, 1986
[51] Int. Cl.[4] .......................... G01K 1/14; G01K 1/16
[52] U.S. Cl. ..................................... 374/208; 374/137; 374/205; 136/221
[58] Field of Search ............... 374/153, 208, 110, 137, 374/179, 205, 206; 136/221, 242; 148/402; 116/216, 221

[56] References Cited

U.S. PATENT DOCUMENTS

| 770,345 | 9/1904 | Wurmb et al. | 374/205 |
|---|---|---|---|
| 3,015,234 | 1/1962 | Springfield | 374/153 |
| 3,483,752 | 12/1969 | Rogen et al. | 116/216 |
| 3,637,438 | 1/1972 | Springfield | 136/242 |
| 3,939,012 | 2/1976 | Williams | 374/137 |
| 4,385,197 | 5/1983 | Schwagerman | 136/221 |
| 4,410,756 | 10/1983 | Schwagerman | 374/208 |
| 4,412,090 | 10/1983 | Kawate et al. | 374/137 |
| 4,533,411 | 8/1985 | Melton | 148/402 |
| 4,554,027 | 11/1985 | Tautzenberger et al. | 148/402 |

Primary Examiner—Charles Frankfort
Assistant Examiner—Thomas B. Will
Attorney, Agent, or Firm—Arthur L. Plevy

[57] ABSTRACT

A thermocouple temperature sensing device is disclosed for monitoring temperature at a plurality of selected locations along the length of an elongated conduit immersed within a heat conducting medium. The thermocouples, being progressive in length, are respectively attached to a common support rod by means of a thermal element. The thermal element is constructed to include an arcuate shaped strip of memory metal attached to the support rod and thermocouple by means of a C-shaped clip. As each thermal element reaches its transition temperature, its shape memory effect causes the thermal element to displace the thermocouple into forceable engagement with the inner wall of the conduit for monitoring the temperature thereat. As long as the thermal element is subjected to its transition temperature, there is a constant force being applied to the thermocouple.

11 Claims, 4 Drawing Figures

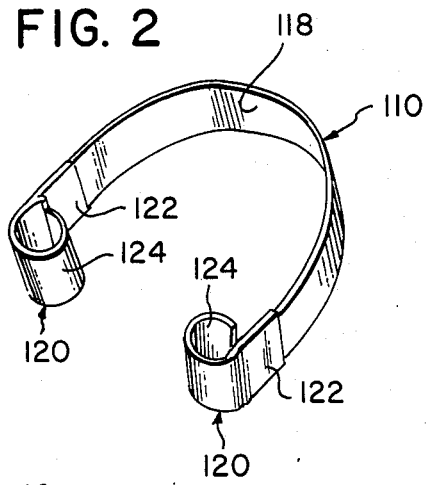
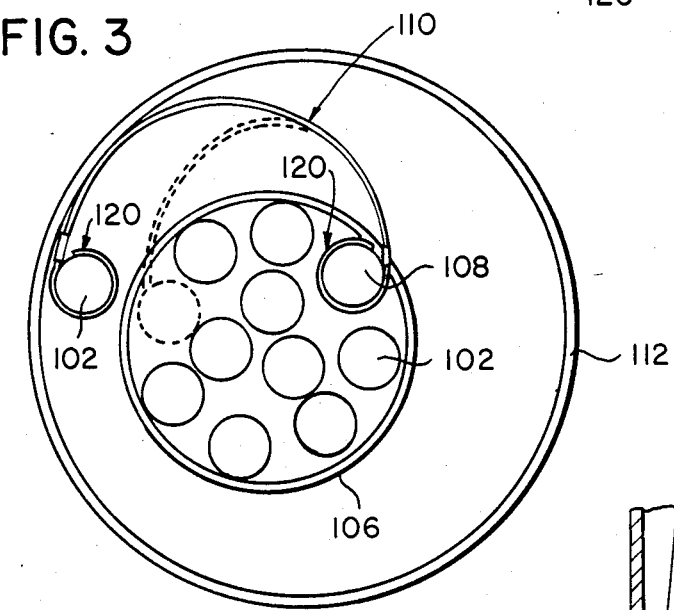
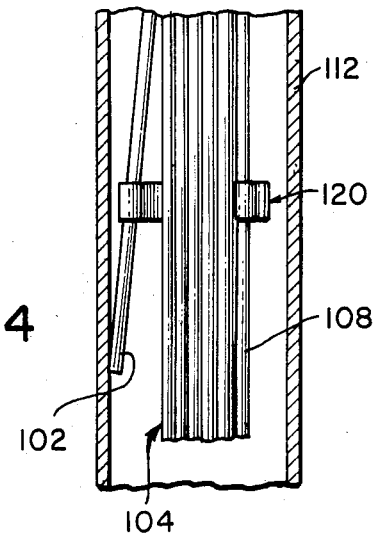

TEMPERATURE SENSING DEVICE

BACKGROUND OF THE INVENTION

The present invention relates in general to a temperature sensing device, and more particularly, to a device for monitoring on a real time basis the temperature of heated vessels at preselected locations along the length of the vessel.

Commercial processes, such as those typically found in the chemical industry, require the continuous real time monitoring of the process temperature as occurring within large scale reactors or vessels at a various locations. Numerous types of temperature monitoring devices are presently known, a typical device being the thermocouple constructed of dissimilar conductive materials joined together at a junction. Thermocouples have found particular utility in monitoring fluid temperature in commercial processes which are carried out in large scale reactors having a height often reaching 100 feet or more. To accurately monitor the temperature at various locations within the reactor, an enclosed conduit is suspended within the process fluid. A plurality of bundled thermocouples are positioned within the conduit, each having a different length to monitor the temperature at a precise predetermined location along the conduit's length.

In order to obtain an accurate temperature reading, it is required that the thermocouple junction be forceably engaged against the inner wall of the conduit at its respective temperature measuring location. It is understood that one has to insert the thermocouple bundle into the conduit and to do so at lengths of 100 feet or more. Hence, the bundle should be as compact as possible to allow easy insertion. Therefore, the prior art supplied bi-metallic devices to allow the individual thermocouple rods to move outwardly under the influence of temperature to thereby contact the wall of the conduit. The devices therefore enabled one to insert a closely packed thermocouple bundle into a conduit in a rapid and reliable manner, while assuring that each rod contacted the conduit wall when the bundle was exposed to a suitable temperature. Known thermocouple devices, such as disclosed in U.S. Pat. Nos. 3,263,502 and 3,015,234, use such bi-metallic clips which are responsive to the presence of selected temperature ranges for exerting the necessary contact force. However, these bi-metallic clips are prone to deterioration of their spring force when subjected to prolonged high temperatures. This deterioration ultimately prevents sufficient forceable engagement of the thermocouple junction with the conduit to give accurate temperature readings, therefore causing a marked decrease in sensitivity.

Additionally, the frequent cold working of these bi-metallic clips often results in their mechanical failure and then necessitate time consuming repair or replacement. In the event of such failure, the thermocouple loses its contact with the conduit entirely, thereby measuring and recording only the temperature of the dead air within the conduit, which is an inaccurate and unreliable indication of the temperature of the process fluid within the reactor. Accordingly, there is the need for a temperature sensing device of the dynamic type which overcomes and avoids the disadvantages resulting from the use of these bi-metallic clips of the known thermocouple temperature sensing devices.

SUMMARY OF THE INVENTION

One object of the present invention is to provide a temperature sensing device for continuously monitoring temperature on a real time basis at a plurality of selected locations along the length of an elongated conduit immersed within a heat conductive medium.

Another object of the present invention is to provide a temperature sensing device constructed of a bundle of thermocouples each associated with a thermal element adapted for maintaining forceable engagement of each thermocouple with the inner wall of the conduit at its corresponding location for accurate temperature monitoring thereat.

Another object of the present invention is to provide a temperature sensing device which may be coiled for ease of transportation.

Another object of the present invention is to provide a temperature sensing device employing a thermal element of memory metal which is capable of exerting a force greatly exceeding that obtainable by the use of known bi-metallic elements.

Another object of the present invention is to provide a temperature sensing device employing a memory metal thermal element operative over long periods of time, while being subjected to high temperatures without failure as a result of loss of spring force, mechanical failure or the like.

In accordance with one embodiment of the present invention, there is disclosed a temperature sensing device for monitoring temperature at a location along the length of an elongated conduit. The temperature sensing device is constructed of a support means extendable within the conduit, temperature sensing means extendable within the conduit and having an end portion movable between a first position adjacent the support means and a second position in forceable contact with an inner wall of the conduit for monitoring the temperature thereat, and a thermal element constructed of a memory metal having a transition temperature attached between the support means and the temperature sensing means, the thermal element outwardly moving the end portion of the temperature sensing means from the first position to the second position in response to the presence of the transition temperature within the conduit.

BRIEF DESCRIPTION OF THE DRAWINGS

The above description, as well as other objects, features and advantages of the present invention will be more fully understood by reference to the following detailed description of a presently preferred, but nonetheless illustrative, temperature sensing device when taken in conjunction with the accompanying drawings, wherein:

FIG. 2 is a perspective view of the thermal element constructed of an elongated arcuate strip of memory metal having a pair of clips at either end thereof for respective attachment to the support rod and a lower portion of a thermocouple;

FIG. 3 is a cross-sectional view of the temperature sensing device received within an elongated conduit and showing the outward movement of a selected thermocouple into forceable engagement with the inner wall of the conduit by operation of the thermal element; and FIG. 4 is a front elevational view, in partial cross-section, of the temperature sensing device received within the elongated conduit and showing the thermocouple forceably engaged with the conduit in response to the thermal element being in the presence of the transition temperature of the memory metal.

DETAILED DESCRIPTION

Figure 1:
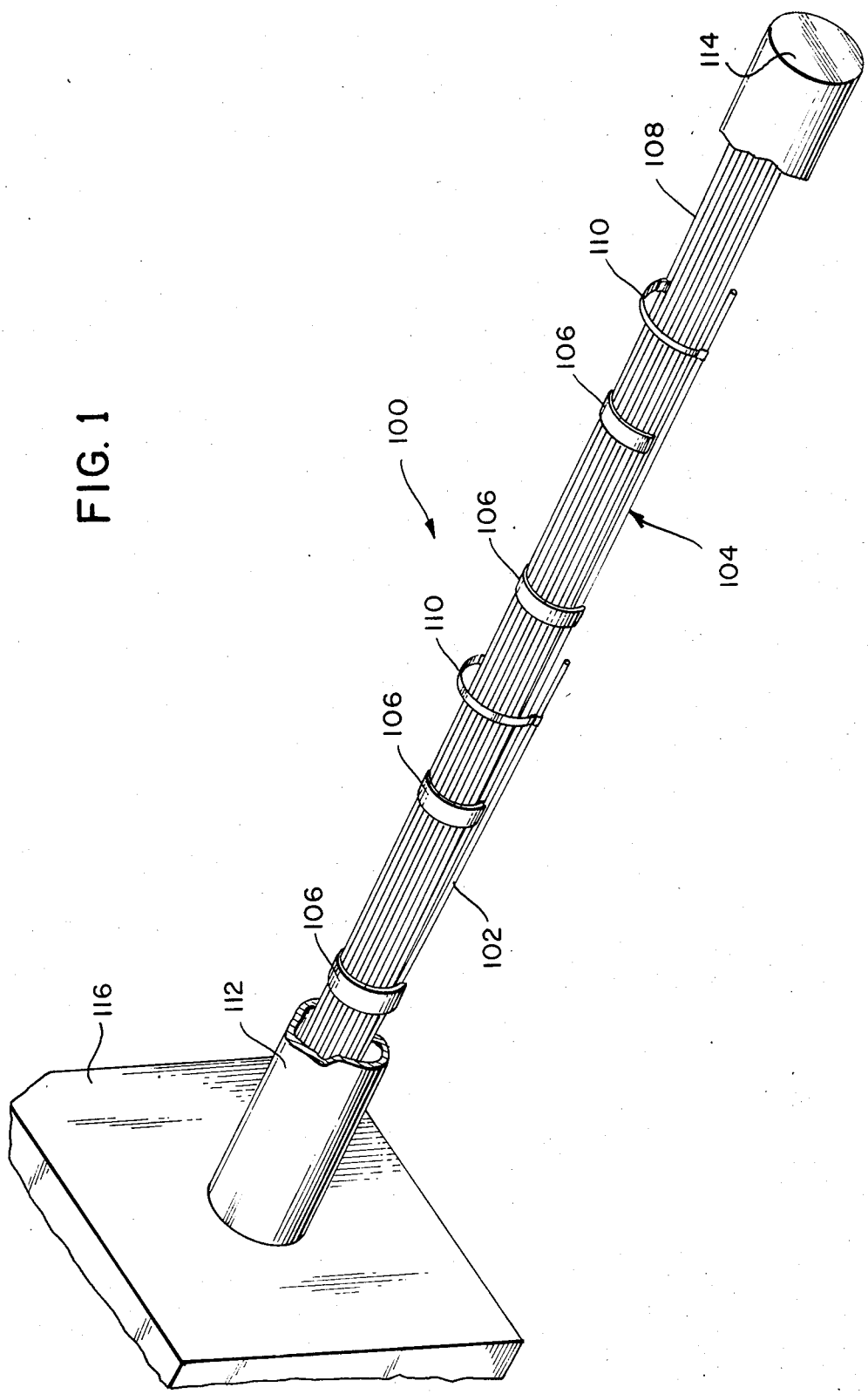
FIG. 1 is a perspective view of a temperature sensing device of the present invention including a bundle of thermocouples of progressive length each attached to a common support rod by a thermal element constructed of a memory metal having a transition temperature which effects its shape, and which bundle is extendable within an elongated conduit closed at one end thereof.

Referring now to the drawings, wherein like reference numbers represent like elements, there is shown in FIG. 1 a temperature sensing device generally designated by reference number 100. The device 100 is constructed of a plurality of individual thermocouples 102 of progressive lengths arranged in a common bundle 104 by means of a plurality of spaced apart stainless steel straps 106. Contained within the bundle 104 is an elongated common support rod 108. Each of the thermocouples 102 are attached to the support rod 108 by means of a thermal element 110 as to be described hereinafter. One type of thermocouple 102 suitable for use in the device 100 of the invention is sold under the trademark Ceramo by Thermo Electric of Saddle Brook, N.J., the assignee herein.

The bundle 104 is slidingly received within the interior of an elongated conduit 112 of heat conducting material and having a closed end 114. The conduit 112 is attached to a housing 116 containing the appropriate electronic equipment (not shown) for measuring and monitoring the temperatures being sensed by each of the thermocouples 102. This electronic equipment is considered to be known to those having ordinary skill in this art and therefore forms no part of the present invention.

Turning now to FIG. 2, the thermal element 110 includes an elongated strip 118 of memory metal formed into an arcuate or arched shape. Elements formed of memory metal have a trained shape response to the presence of a predetermined transition temperature range. Suitable memory metals are sold under the trademark Nitinol by Special Metals Corporation of New Hartford, N.Y. These memory metals comprise a family of intermetallic compounds consisting of nickel and titanium, for example, 53–57% nickel, balance titanium. The temperature at which transitional reaction occurs, i.e. shape memory effect, is dependent upon the specific nickel/titanium analysis. This relationship has been defined as 1% nickel/titanium equals 150° C. change in transition temperature, or 70 ppm nickel/titanium per 1° C. The elongated strip 118 is formed of such memory metal using powder metallurigcal processes which provide transitional temperature uniformity of, for example, +3° C. A general discussion of memory metals may be found in *Shape Memory Alloys*, L. M. Schetky, "Scientific America", Vol. 241, No. 5, November 1979 and *Some Applications Of Shape Memory Alloys*, C. M. Wayman, "Journal Of Metals", Metallurgical Society of AIME, Vol. 32, No. 6, January 1980.

It is known that members formed of memory metal, due to their inherent nature and powder metallurgical processing, cannot be joined using such techniques as spot welding, arc welding, crimping or gas welding. In order to attach the elongated strip 118 to the support rod 108 and a respective one of the thermocouples 102, a clip 120 is provided at either end of the strip. The clip 120 is constructed of a tab portion 122 and a C-shaped portion 124 attached to each free end of the strip 118. Specifically, the tab portion 122 is crimped about the free end of the strip 118 and brazed thereon using a nicro braze employing nickel alloy solder, such as AWS Spec. BNi-2. Each thermocouple 102 contained within the bundle 104 is attached to the support rod 108 by means of a thermal element 110. This is achieved by mechanically crimping the C-shaped portion 124 of each thermal element 110 about a respective thermocouple 102 and the support rod 108. As shown in FIG. 1, the thermal elements 110 are secured adjacent the free end of each thermocouple 102.

Turning now to FIGS. 3 and 4, a brief description of the operation of the temperature sensing device 100 will now be described. The bundle 104 of thermocouples 102 is arranged extending within the conduit 112 and spaced from its inner wall to permit relative movement therebetween for ease of installation. The conduit 112 is suspended within a fluid whose temperature is to be monitored on a real time basis at different levels by means of the thermocouples 102. Upon a thermal element 110 being subjected to its transition temperature, such element will change shape due to its construction from memory metal. During this change of shape, the thermal element 110 will affect outward movement of its correspondingly attached thermocouple 102 so as to forceably engage the inner wall of the conduit 112. As long as the thermal element 110 is subjected to a temperature above its transition temperature, the thermocouple 102 will be maintained in engagement with the conduit 112. A typical transition temperature for the element 110 is about 200° F. As such, continuous and accurate monitoring of the temperature of the surrounding fluid at the location of each thermocouple 102 may be attained. The force extended by the thermal element 110 is 40 times greater than forces exerted by conventional bi-metallic spring materials. Furthermore, the force exerted by the thermal element 110 is non-deteriorating and remains constant with temperature as long as the transition temperature is exceeded.

Once the temperature of the dead air space within the conduit 112 has dropped below the transition temperature of the thermal element 110, such element will return to its original shape, thereby bringing the thermocouple 102 back to its original position within the bundle 104 as shown in FIG. 1. At such time, the temperature sensing device 100 can be conveniently withdrawn from the conduit 112 without danger of injuring the thermocouples 102 due to their previous forceable engagement with the inner wall of the conduit 112.

Although the invention herein has been described with reference to particular embodiments, it is to be understood that these embodiments are merely illustrative of the principals and application of the present invention. It is therefore to be understood that numerous modifications may be made in the illustrative embodiments and that other arrangements may be devised without departing from the spirit and scope of the present invention as defined by the appended claims.

What is claimed is:

1. A temperature sensing device for monitoring the temperature at a location along the length of an elongated conduit, said temperature sensing device comprising a support means extendable within said conduit, temperature sensing means extendable within said conduit and having an end portion movable between a first position adjacent said support means and a second position in forceable contact with an inner wall of said conduit for monitoring the temperature thereat, and a thermal element constructed of a memory metal having a transition temperature attached between said support means and said temperature sensing means, said thermal element having first and second clips rigidly secured to said element each at opposite ends by means of an associated extending clip tab which tab is brazed to said memory metal element at said ends, with each of said clips having a "C" shaped portion coupled to said associated tab with said "C" shaped portion of said first clip encircling said support means and with said "C" shaped portion of said second clip encircling said temperature sensing means, said thermal element outwardly moving said end portion of said temperature sensing means from said first position to said second position in response to the presence of said transition temperature within said conduit due to said encircling clips as rigidly secured to said memory metal element.

2. The temperature sensing device of claim 1, wherein said support means comprises a support extensible within said conduit.

3. The temperature sensing device of claim 1, wherein said thermal element comprises an elongated strip having an arcuate shape.

4. The temperature sensing device of claim 3, wherein said memory metal comprises an intermetallic compound of nickel and titanium.

5. The temperature sensing device of claim 1, wherein said temperature sensing means comprises a thermocouple.

6. The temperature sensing device of claim 1, wherein said temperature sensing means when in said first position permits relative longitudinal movement between said temperature sensing means and said conduit.

7. The temperature sensing device of claim 1, further including a plurality of said temperature sensing means each attached to said support means by a respective one of a plurality of said thermal elements, each said temperature sensing means having a respective end portion forceably contacting said inner wall of said conduit at a different longitudinal location in response to the operation of its corresponding thermal element.

8. The temperature sensing device of claim 7 further including at least one strap surrounding said plurality of thermal sensing means to form a bundle therefrom.

9. The temperature sensing device of claim 8, wherein the number of said thermal sensing means within said bundle decreases from one end of said conduit to another end of said conduit.

10. The temperature sensing device of claim 7, wherein said support means is arranged at the circumference of an imaginary circle confining said plurality of said thermal sensing means.

11. A thermocouple device for monitoring temperature at a predetermined location along the length of an elongated heat transferring conduit immersed within a fluid, said thermocouple device comprising an elongated support rod extendable within said conduit; an elongated thermocouple extending within said conduit and having an end portion movable between a first position adjacent said support rod and a second position in forceable contact with an inner wall of said conduit for monitoring the temperature thereat due to heat transfer from said fluid through said conduit; and a thermal element constructed of a strip having an arcuate shape and including a memory metal having a preselected transition temperature, and attaching means provided at either end of said strip for attaching said strip to said support rod and said thermocouple said attaching means including first and second clips secured to said element each at opposite ends by means of an associated extending clip tab which tab is brazed to said memory metal element at said ends, with each of said clips having a "C" shaped portion coupled to said associated tab with said "C" shaped portion of said first clip encircling said support means and with said "C" shaped portion of said second clip encircling said temperature sensing means, said thermal element outwardly moving said end portion of said thermocouple from said first position to said second position upon the change of shape of said strip in response to the presence of said transition temperature within said conduit due to said encircling clips as rigidly secured to said memory metal element.

* * * * *